(12) United States Patent
Hashimoto (10) Patent No.: US 12,487,849 B2
(45) Date of Patent: Dec. 2, 2025

(54) RESOURCE MANAGEMENT DEVICE, METHOD, AND COMPUTER PROGRAM FOR RESOURCE MANAGEMENT

(71) Applicant: TOYOTA JIDOSHA KABUSHIKI KAISHA, Toyota (JP)

(72) Inventor: Koshiro Hashimoto, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 379 days.

(21) Appl. No.: 18/186,607

(22) Filed: Mar. 20, 2023

(65) Prior Publication Data

US 2023/0376342 A1    Nov. 23, 2023

(30) Foreign Application Priority Data

May 17, 2022    (JP) .................................. 2022-081059

(51) Int. Cl.
| | |
|---|---|
| *G06F 12/00* | (2006.01) |
| *G06F 9/48* | (2006.01) |
| *G06F 9/54* | (2006.01) |

(52) U.S. Cl.
CPC ............ *G06F 9/4818* (2013.01); *G06F 9/544* (2013.01)

(58) Field of Classification Search
CPC ................. G06F 9/4818; G06F 9/544; G06F 2209/5021; G06F 9/526; G06F 9/4881; G06F 9/4812

USPC ........................................................ 711/118
See application file for complete search history.

(56) References Cited

U.S. PATENT DOCUMENTS

| | | | |
|---|---|---|---|
| 12,130,744 B2 * | 10/2024 | Kreinin | .................. G06F 9/3826 |
| 2007/0118838 A1 | 5/2007 | Tsujino et al. | |
| 2010/0275211 A1 | 10/2010 | Webber | |

FOREIGN PATENT DOCUMENTS

| | | |
|---|---|---|
| JP | H07-082444 B2 | 9/1995 |
| JP | 2007-148582 A | 6/2007 |
| JP | 2012-525620 A | 10/2012 |
| WO | WO-2016199154 A1 * | 12/2016 ............... G06T 1/60 |

* cited by examiner

*Primary Examiner* — Mardochee Chery
(74) *Attorney, Agent, or Firm* — Oliff PLC

(57) ABSTRACT

A resource management device includes a processor configured to update registered process information indicating priority of a process being executed and an area in a shared resource used by the process, at every start or end of execution of one of processes using the shared resource, determine, when a first process being executed rewrites data stored in the shared resource, whether a second process using an area in the shared resource used by the first process exists, by referring to the registered process information, interrupt the first process until termination of the second process when the second process having higher priority than the first process exists, and interrupt the second process until termination of the first process when the second process having lower priority than the first process exists.

5 Claims, 5 Drawing Sheets

RESOURCE MANAGEMENT DEVICE, METHOD, AND COMPUTER PROGRAM FOR RESOURCE MANAGEMENT

FIELD

The present invention relates to a resource management device, a method and a computer program for managing a shared resource usable by multiple processes in common.

BACKGROUND

A technique to determine the order of execution of multiple processes dynamically in a system that can execute the processes in parallel has been proposed (see Japanese Unexamined Patent Publication JP2012-525620A).

A method disclosed in JP2012-525620 is to dynamically determine which instructions from a plurality of available instructions to issue in each clock cycle in a multithreaded processor capable of issuing a plurality of instructions in each clock cycle. The method includes determining a highest priority instruction from the plurality of available instructions, and determining the compatibility of the highest priority instruction with each of the remaining available instructions. In this method, it is determined that instructions are compatible with each other if they do not require the same resources. The method further includes issuing the highest priority instruction together with other instructions compatible both with the highest priority instruction and with each other in the same clock cycle. The highest priority instruction is not a speculative instruction.

SUMMARY

In some cases, a process of relatively low priority among multiple processes executed simultaneously occupies a shared resource earlier. In such cases, a process of relatively high priority among the processes executed simultaneously has to wait for execution.

It is an object of the present invention to provide a resource management device that can ensure that a high-priority process is preferentially executed among multiple processes using a shared resource.

According to an embodiment, a resource management device is provided. The resource management device includes a memory configured to store registered process information indicating priority of a process being executed using a shared resource among a plurality of processes and an area in the shared resource used by the process; and a processor configured to: update the registered process information so as to add, at every start of execution of one of the processes, the priority and the area in the shared resource of the one of the processes to the registered process information and to delete, at every end of use of the shared resource in one of the processes, the priority and the area in the shared resource of the one of the processes from the registered process information, determine, when a first process being executed using the shared resource among the processes rewrites data stored in the shared resource, whether a second process being executed using an area in the shared resource used by the first process exists among the processes, by referring to the registered process information, interrupt the first process until termination of the second process when the second process having higher priority than the first process exists, and interrupt the second process until termination of the first process when the second process having lower priority than the first process exists.

In the case where the first process is interrupted, the processor of the resource management device preferably causes the first process to be executed again from the beginning, upon termination of the second process having higher priority than the first process.

Preferably, in the resource management device, one of the processes is an object detection process to detect a predetermined object represented in a sensor signal generated by a sensor from the sensor signal, another one of the processes is an error detection process to detect an error or trouble that has occurred in the sensor, and the error detection process is assigned higher priority than the object detection process.

According to another embodiment of the present invention, a method for resource management is provided. The method includes: updating registered process information indicating priority of a process being executed using a shared resource among a plurality of processes and an area in the shared resource used by the process, the registered process information being stored in a memory, so as to add, at every start of execution of one of the processes, the priority and the area in the shared resource of the one of the processes to the registered process information and to delete, at every end of use of the shared resource in one of the processes, the priority and the area in the shared resource of the one of the processes from the registered process information; determining, when a first process being executed using the shared resource among the processes rewrites data stored in the shared resource, whether a second process being executed using an area in the shared resource used by the first process exists among the processes, by referring to the registered process information; interrupting the first process until termination of the second process when the second process having higher priority than the first process exists; and interrupting the second process until termination of the first process when the second process having lower priority than the first process exists.

According to still another embodiment of the present invention, a non-transitory recording medium that stores a computer program for resource management is provided. The computer program includes instructions causing a computer to execute processing including: updating registered process information indicating priority of a process being executed using a shared resource among a plurality of processes and an area in the shared resource used by the process, the registered process information being stored in a memory, so as to add, at every start of execution of one of the processes, the priority and the area in the shared resource of the one of the processes to the registered process information and to delete, at every end of use of the shared resource in one of the processes, the priority and the area in the shared resource of the one of the processes from the registered process information; determining, when a first process being executed using the shared resource among the processes rewrites data stored in the shared resource, whether a second process being executed using an area in the shared resource used by the first process exists among the processes, by referring to the registered process information; interrupting the first process until termination of the second process when the second process having higher priority than the first process exists; and interrupting the second process until termination of the first process when the second process having lower priority than the first process exists.

The resource management device according to the present invention has an advantageous effect of being able to ensure that a high-priority process is preferentially executed among multiple processes using a shared resource.

DESCRIPTION OF EMBODIMENTS

A resource management device as well as a method and a computer program for resource management executed by the resource management device will now be described with reference to the attached drawings. The resource management device uses registered process information to manage priority of a process being executed using a shared resource among a plurality of processes and an area in the shared resource used by the process. More specifically, the resource management device adds, at every start of execution of any process, the priority of the process and the area in the shared resource used by the process to the registered process information, and deletes, at every end of use of the shared resource in any process, the priority and the area in the shared resource of the process from the registered process information. When a first process being executed using the shared resource rewrites data stored in the shared resource, the resource management device refers to the registered process information and determines whether a second process being executed using an area in the shared resource used by the first process exists. When the second process exists and has higher priority than the first process, the resource management device interrupts the first process until termination of the second process. When the second process exists and has lower priority than the first process, the resource management device interrupts the second process until termination of the first process.

The following describes an example in which the resource management device is applied to a vehicle control system. In this example, the resource management device detects objects around a vehicle from an image obtained by a camera mounted on the vehicle, and executes autonomous driving control of the vehicle so that the vehicle will not collide with any of the detected objects. To this end, the resource management device temporarily stores images received from the camera in a shared resource, and executes a process to detect an object on the basis of an image stored in the shared resource (hereafter an "object detection process") and a process to detect a failure or trouble of the camera (hereafter an "error detection process").

Figure 1:
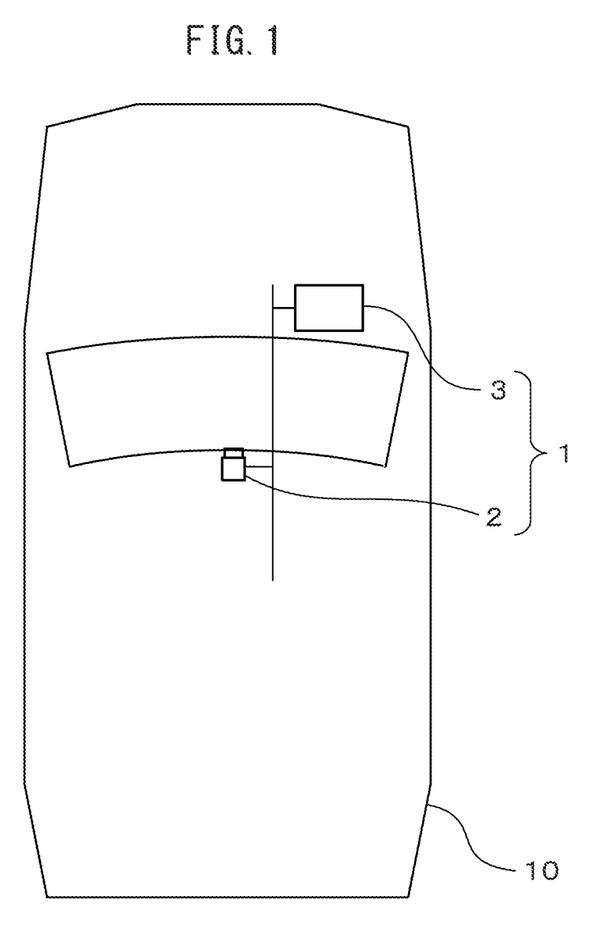
FIG. 1 schematically illustrates the configuration of a vehicle control system equipped with a resource management device.
Figure 2:
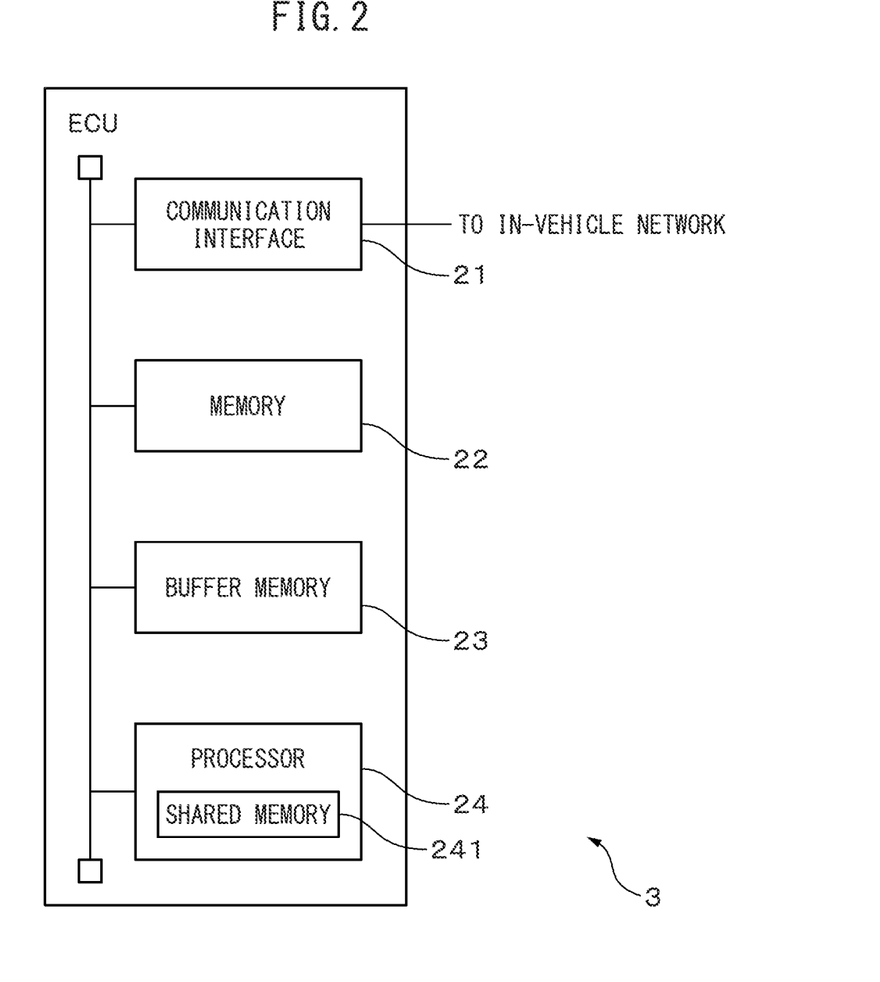
FIG. 2 illustrates the hardware configuration of an electronic control unit, which is an embodiment of the resource management device.

FIG. 1 schematically illustrates the configuration of a vehicle control system equipped with the resource management device. FIG. 2 illustrates the hardware configuration of an electronic control unit, which is an embodiment of the resource management device. In the present embodiment, the vehicle control system 1, which is mounted on a vehicle 10 and controls the vehicle 10, includes a camera 2 for taking pictures of the surroundings of the vehicle 10, and an electronic control unit (ECU) 3, which is an example of the resource management device. The camera 2 is communicably connected to the ECU 3 via an in-vehicle network conforming to a standard such as a controller area network. The vehicle control system 1 may further include a storage device (not illustrated) that stores a map used for autonomous driving control of the vehicle 10, and a distance sensor (not illustrated) for measuring the distances to objects around the vehicle 10, such as LiDAR or radar. The vehicle control system 1 may further include a receiver (not illustrated) for determining the position of the vehicle 10 in conformity with a satellite positioning system, such as a GPS receiver; a wireless communication terminal (not illustrated) for wireless communication with another device; and a navigation device (not illustrated) for searching for a planned travel route of the vehicle 10.

The camera 2, which is an example of the sensor, includes a two-dimensional detector constructed from an array of optoelectronic transducers, such as CCD or C-MOS, having sensitivity to visible light and a focusing optical system that forms an image of a target region on the two-dimensional detector. For example, the camera 2 is mounted in the interior of the vehicle 10 and oriented to the front of the vehicle 10 so as to take pictures of a predetermined region in front of the vehicle 10. The vehicle 10 may include multiple cameras taking pictures in different orientations or having different focal lengths. The camera 2 takes a picture of a predetermined region around the vehicle 10 every predetermined capturing period (e.g., 1/30 to 1/10 seconds), and generates images representing the predetermined region. The images obtained by the camera 2 may be color or grayscale images. Each image obtained by the camera 2 is an example of target data for processes assigned degrees of priority and an example of the sensor signal.

Every time an image is generated, the camera 2 outputs the generated image to the ECU 3 via the in-vehicle network.

The ECU 3 executes autonomous driving control of the vehicle 10. In the present embodiment, the ECU 3 controls the vehicle 10 to automatically drive the vehicle 10, based on objects detected from time-series images obtained by the camera 2. To achieve this, the ECU 3 includes a communication interface 21, a memory 22, a buffer memory 23, and a processor 24. The communication interface 21, the memory 22, the buffer memory 23, and the processor 24 may be configured as different circuits or a single integrated circuit.

The communication interface 21 includes an interface circuit for connecting the ECU 3 to the in-vehicle network. In other words, the communication interface 21 is connected to the camera 2 via the in-vehicle network. Every time an image is received from the camera 2, the communication interface 21 passes the received image to the processor 24.

The memory 22, which is an example of the storage unit, includes, for example, volatile and nonvolatile semiconductor memories. The memory 22 stores an algorithm for a vehicle control process executed by the processor 24 of the ECU 3, and various types of data and various parameters used in the vehicle control process. For example, the memory 22 stores map information, a set of parameters for specifying a classifier used in the vehicle control process, and degrees of priority of processes to be executed on images. The memory 22 further stores registered process information and various types of data generated during the vehicle control process, such as information on detected objects, for a certain period.

The buffer memory 23, which is another example of the storage unit, includes, for example, a volatile semiconductor memory. The buffer memory 23 temporarily stores images received from the camera via the communication interface 21.

The processor 24 is an example of a control unit. In the present embodiment, the processor 24 includes, for example, one or more central processing units (CPUs) and a peripheral circuit thereof. The processor 24 may further include an arithmetic circuit or a graphics processing unit (GPU). In addition, the processor 24 includes a shared memory 241, which is an example of the shared resource and is configured, for example, as a memory circuit accessible from the operating circuits or processing circuits included in the processor 24, such as the CPUs and GPU.

Every time an image is received from the camera 2 during travel of the vehicle 10, the processor 24 writes the received image in the buffer memory 23. In addition, the processor 24 executes the vehicle control process, based on images stored in the buffer memory 23.

Figure 3:
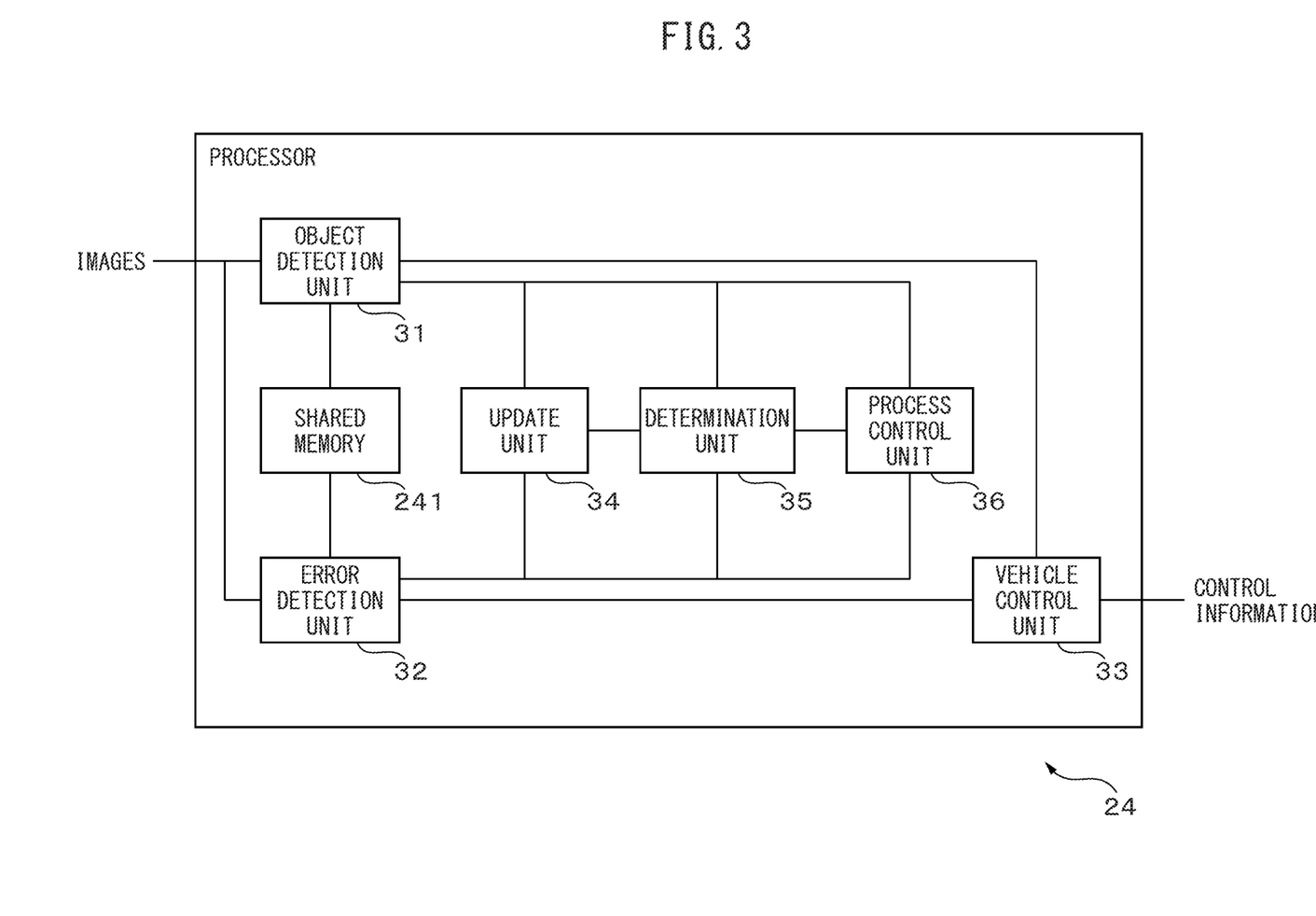
FIG. 3 is a functional block diagram of a processor of the electronic control unit, related to a vehicle control process including a resource management process.

FIG. 3 is a functional block diagram of the processor 24 of the ECU 3, related to the vehicle control process including a resource management process. The processor 24 includes an object detection unit 31, an error detection unit 32, a vehicle control unit 33, an update unit 34, a determination unit 35, and a process control unit 36. These units included in the processor 24 are functional modules, for example, implemented by a computer program executed by the processor 24. Of these units included in the processor 24, processing executed by the update unit 34, the determination unit 35, and the process control unit 36 corresponds to the resource management process, and is executed, for example, by one of the CPUs included in the processor 24. The object detection process executed by the object detection unit 31 and the error detection process executed by the error detection unit 32 are an example of processes executed using the shared memory 241, which is an example of the shared resource. In the present embodiment, assume that the object detection process and the error detection process are executed asynchronously, and the processing of the error detection unit 32 has higher priority than that of the object detection unit 31. Thus execution of the error detection process is prevented from being made to wait by execution of the object detection process. This enables the processor 24 to transfer control of the vehicle 10 to the driver promptly when an error or trouble occurs in the camera 2. The processes executed using the shared memory 241 may include a process other than the object detection process and the error detection process. For example, processing of the vehicle control unit 33 may also be executed using the shared memory 241. A memory area in the shared memory 241 where a process writes data or reads written data is an example of an area in the shared resource used by a process.

The object detection unit 31 inquires of the process control unit 36 permission to execute the object detection process, every first period. When permission to execute the object detection process is obtained from the process control unit 36, the object detection unit 31 writes the latest image stored in the buffer memory 23, in the shared memory 241. The object detection unit 31 then notifies the update unit 34 of process start information, which includes identifying information and priority of the object detection process and information indicating a memory area in the shared memory 241 used by the object detection unit 31. Further, the object detection unit 31 executes the object detection process on the image written in the shared memory 241. By the object detection process, the object detection unit 31 detects detection target objects around the vehicle 10 that are represented in the image.

In the present embodiment, the object detecting unit 31 detects an object region including a detection target object represented in the image and identifies the type of the detection target object, by inputting the image into a classifier. Examples of detection target objects include vehicles, pedestrians, road markings such as lane-dividing lines, various signposts, and traffic lights. As such a classifier, the object detection unit 31 can use a "deep neural network" (hereafter simply a "DNN"). The DNN used as the classifier may be one having architecture of a convolutional neural network type, such as Single Shot MultiBox Detector (SSD) or Faster R-CNN, or one having architecture of a self-attention network type, such as Vision Transformer. Such a classifier is trained in advance with a large number of images representing detection target objects (training images) in accordance with a predetermined training technique, such as backpropagation, so as to detect a detection target object from an image.

The processing of the object detection unit 31 is executed by an operating circuit included in the processor 24, such as the GPU. The object detection unit 31, or actually, the operating circuit that executes the processing of the object detection unit 31 (the same is true for the following), reads the image from the shared memory 241, and inputs the read image into the classifier to detect a detection target object. To this end, the object detection unit 31 writes intermediate data generated during operation of the classifier, in the shared memory 241. However, the object detection unit 31 notifies the determination unit 35 and the process control unit 36 of rewrite information, which includes identifying information of the process to write intermediate data and information indicating an area where the intermediate data is to be written, and writes the intermediate data in the shared memory 241 when permission to write intermediate data is obtained from the process control unit 36.

When permission to write intermediate data is not obtained, the object detection unit 31 waits until a retry request is notified by the process control unit 36. Upon notification of a retry request, the object detection unit 31 redoes the object detection process from the beginning. Specifically, the object detection unit 31 reads the latest image from the buffer memory 23 again, and writes the latest image in the shared memory 241. The object detection unit 31 then executes the object detection process again on the latest image written in the shared memory 241.

When a retry request is notified by the process control unit 36 during execution of the object detection process regardless of whether intermediate data is written, the object detection unit 31 also redoes the object detection process from the beginning in the same manner as described above.

Upon detection of a detection target object from an image, the object detection unit 31 notifies the vehicle control unit 33 of detection information indicating the position and area of an object region representing the detection target object in the image and the type of the object included in the object region. Further, the object detection unit 31 outputs process end notification indicating that the object detection process is terminated to the update unit 34.

The error detection unit 32 inquires of the process control unit 36 permission to execute the error detection process, every second period different from the first period. When permission to execute the error detection process is obtained from the process control unit 36, the error detection unit 32 writes time-series images obtained in the most recent certain period and stored in the buffer memory 23, in the shared memory 241. The error detection unit 32 then notifies the update unit 34 of process start information, which includes identifying information and priority of the error detection process and information indicating a memory area in the shared memory 241 used by the error detection unit 32. Further, the error detection unit 32 executes the error detection process on the time-series images written in the shared memory 241. By the error detection process, the error detection unit 32 detects an error or trouble that has occurred in the camera 2.

In the present embodiment, the error detection unit 32 calculates an average or median of pixel values as an error index for each of the time-series images, and determines whether the error index calculated for each image satisfies an error criterion. For example, when the error index calculated for each image is less than a solid black threshold indicating that the whole image is filled with black, the error detection unit 32 determines that the error criterion is satisfied. When the error index calculated for each image is greater than a solid white threshold indicating that the whole image is filled with white, the error detection unit 32 determines that the error criterion is satisfied.

The processing of the error detection unit 32 is executed by an operating circuit included in the processor 24, such as the CPU. The error detection unit 32, or actually, the operating circuit that executes the processing of the error detection unit 32 (the same is true for the following), reads the time-series images from the shared memory 241, and executes the error detection process on the read time-series images to determine whether the error criterion is satisfied. To this end, the error detection unit 32 writes intermediate data generated during the error detection process, such as the error index for each image, in the shared memory 241. However, the error detection unit 32 notifies the determination unit 35 and the process control unit 36 of rewrite information, which includes identifying information of the process to write intermediate data and information indicating an area where the intermediate data is to be written, and writes the intermediate data in the shared memory 241 when permission to write intermediate data is obtained from the process control unit 36.

When permission to write intermediate data is not obtained, the error detection unit 32 waits until a retry request is notified by the process control unit 36. Upon notification of a retry request, the error detection unit 32 redoes the error detection process from the beginning. Specifically, the error detection unit 32 reads the time-series images of the most recent period from the buffer memory 23 again, and writes the latest images in the shared memory 241. The error detection unit 32 then executes the error detection process again on the time-series images written in the shared memory 241.

When a retry request is notified by the process control unit 36 during execution of the error detection process regardless of whether intermediate data is written, the error detection unit 32 also redoes the error detection process from the beginning in the same manner as described above.

When the error criterion is satisfied, the error detection unit 32 notifies the vehicle control unit 33 that an error or trouble has occurred in the camera 2. Further, the error detection unit 32 outputs process end notification indicating that the error detection process is terminated to the update unit 34.

The vehicle control unit 33 generates one or more planned trajectories of the vehicle 10 in the nearest predetermined section (e.g., 500 m to 1 km) so that the vehicle 10 will travel along a planned travel route to a destination. Each planned trajectory is represented, for example, as a set of target positions of the vehicle 10 at respective times during travel of the vehicle 10 through the predetermined section. The vehicle control unit 33 controls components of the vehicle 10 so that the vehicle 10 will travel along the planned trajectory. The processing of the vehicle control unit 33 is executed by an operating circuit included in the processor 24, such as the CPU.

The vehicle control unit 33 generates a planned trajectory so that the vehicle 10 will not collide with any of objects around the vehicle 10 (e.g., other vehicles) detected from time-series images obtained by the camera 2. To achieve this, the vehicle control unit 33 tracks the detected objects by referring to the detection information on each of the time-series images notified by the object detection unit 31.

For example, the vehicle control unit 33 applies a tracking process based on optical flow, such as the Lucas-Kanade method, to an object region of interest in the latest image and the object regions in the past images obtained by the camera 2, thereby tracking the object represented in the object regions. To this end, the vehicle control unit 33 applies, for example, a filter for extracting feature points, such as SIFT or Harris operator, to the object region of interest, thereby extracting feature points from this object region. The vehicle control unit 33 then identifies those points in the object regions in the past images which correspond to the feature points in accordance with the applied tracking technique, thereby calculating the optical flow. Alternatively, the vehicle control unit 33 may apply another tracking technique applied for tracking a moving object detected from an image to the object region of interest in the latest image and the object regions in the past images, thereby tracking the object represented in the object regions.

For each object being tracked, the vehicle control unit 33 executes viewpoint transformation, using information such as the position where the camera 2 is mounted on the vehicle 10, thereby transforming the image coordinates of the object into coordinates in an aerial image ("aerial-image coordinates"). To this end, the vehicle control unit 33 can estimate the position of the detected object at the time of acquisition of each image, using the position and orientation of the vehicle 10, an estimated distance to the detected object, and the direction from the vehicle 10 to the object at the time of acquisition of each image. The position and orientation of the vehicle 10 at the time of acquisition of each image may be estimated by comparing the image obtained by the camera 2 with a high-precision map. The vehicle control unit 33 can estimate a predicted trajectory of the object to a predetermined time ahead by executing a prediction process using, for example, a Kalman filter or a particle filter on sequential aerial-image coordinates.

The vehicle control unit 33 generates a planned trajectory of the vehicle 10, based on the predicted trajectories of the objects being tracked, so that a predicted distance between the vehicle 10 and any of the tracked objects will not be less than a predetermined distance until a predetermined time ahead. In addition, the vehicle control unit 33 determines whether the vehicle 10 needs to make a lane change to go to a destination, by referring to the map information and the current position of the vehicle 10 determined by a GPS receiver (not illustrated). When a lane change is unnecessary, the vehicle control unit 33 generates the planned trajectory by referring to detected lane-dividing lines so that the trajectory will not deviate from a lane on which the vehicle 10 is traveling. When a lane change is necessary, the vehicle control unit 33 generates the planned trajectory so that the vehicle 10 will move to a lane leading toward the destination. The vehicle control unit 33 may generate multiple planned trajectories. In this case, the vehicle control unit 33 may select a trajectory such that the sum of the absolute values of acceleration of the vehicle 10 is the smallest among the planned trajectories.

Upon setting a planned trajectory, the vehicle control unit 33 controls components of the vehicle 10 so that the vehicle 10 will travel along the planned trajectory. For example, the vehicle control unit 33 determines a target acceleration of the vehicle 10 according to the planned trajectory and the current speed of the vehicle 10 measured by a vehicle speed sensor (not illustrated), and sets the degree of accelerator opening or the amount of braking so that the acceleration of the vehicle 10 will be equal to the target acceleration. The vehicle control unit 33 then determines the amount of fuel injection according to the set degree of accelerator opening, and outputs a control signal depending on the amount of fuel injection to a fuel injector of an engine of the vehicle 10. Alternatively, the vehicle control unit 33 determines the electric power to be supplied to a motor that drives the vehicle 10, according to the set degree of accelerator opening, and controls a driving circuit of the motor so that the determined electric power will be supplied to the motor. Further, the vehicle control unit 33 outputs a control signal depending on the set amount of braking to the brake of the vehicle 10.

When the direction of the vehicle 10 is changed in order for the vehicle 10 to travel along the planned trajectory, the vehicle control unit 33 determines the steering angle of the vehicle 10 according to the planned trajectory. The vehicle control unit 33 then outputs a control signal depending on the steering angle to an actuator (not illustrated) that controls steering of the vehicle 10.

When notified by the error detection unit 32 that an error or trouble has occurred in the camera 2, the vehicle control unit 33 terminates autonomous driving control and transfers driving control of the vehicle 10 to the driver of the vehicle 10. To achieve this, the vehicle control unit 33 makes notification that driving control will be transferred to the driver, via a user interface (not illustrated) provided in the interior of the vehicle 10. The user interface includes, for example, at least one of the following: one or more light sources or a display provided on an instrument panel, a speaker, and a vibrator provided in the steering wheel or the driver's seat. The vehicle control unit 33 causes the one or more light sources to light up or blink in a predetermined pattern to make notification that driving control will be transferred to the driver. Alternatively, the vehicle control unit 33 causes a predetermined message or icon to appear on the display to make notification that driving control will be transferred to the driver. Alternatively, the vehicle control unit 33 causes the speaker to output a predetermined voice or vibrates the vibrator in a predetermined pattern to make notification that driving control will be transferred to the driver. The vehicle control unit 33 may use two or more of the above-described ways to make notification that driving control will be transferred to the driver.

After a predetermined time from the start of notification of transfer of driving control to the driver, the vehicle control unit 33 terminates autonomous driving control of the vehicle 10. After termination of autonomous driving control, the vehicle 10 is controlled according to the driver's driving operation.

The update unit 34 updates registered process information at every start or end of execution of one of multiple processes using the shared memory 241. The registered process information includes, for each process being executed using the shared memory 241, information indicating priority of the process and a memory area in the shared memory 241 used by the process. More specifically, when process start information is received from the object detection unit 31 or the error detection unit 32, the update unit 34 adds information indicating priority of the process and a memory area in the shared memory 241 used by the process to the registered process information. Every time process end notification is received from the object detection unit 31 or the error detection unit 32, the update unit 34 deletes information indicating priority of the terminated process indicated by the process end notification and a memory area used by the process from the registered process information.

Every time the registered process information is updated, the update unit 34 stores the updated registered process information in the memory 22. When priority and other information on a terminated process are deleted from the registered process information, the update unit 34 notifies the process control unit 36 of the terminated process.

The determination unit 35 refers to the registered process information when a first process that is being executed or about to be executed using the shared memory 241 rewrites data stored in the shared memory 241. The determination unit 35 then determines whether a second process being executed using a memory area in the shared memory 241 used by the first process exists among the processes. In the present embodiment, when notified of rewrite information by the object detection unit 31, the determination unit 35 determines whether there is an error detection process being executed using the memory area indicated by the notified rewrite information, by referring to the registered process information. In this case, the object detection process is an example of the first process. When the memory area used by an error detection process being executed is registered in the registered process information, the determination unit 35 determines whether the registered memory area is the same as the memory area indicated by the rewrite information notified by the object detection unit 31. When the memory area used by the error detection process being executed at least overlaps the memory area indicated by the rewrite information, the determination unit 35 determines that there is an error detection process being executed using the memory area in the shared memory 241 used by the object detection process. In this case, the error detection process being executed is an example of the second process.

When no error detection process being executed using the shared memory 241 is registered in the registered process information, the determination unit 35 determines that there is not an error detection process being executed using the memory area in the shared memory 241 used by the object detection process. When the memory area used by the error detection process being executed does not overlap the memory area indicated by the rewrite information notified by the object detection unit 31, the determination unit 35 also determines that there is not an error detection process being executed using the memory area used by the object detection process.

Similarly, when notified of rewrite information by the error detection unit 32, the determination unit 35 determines whether there is an object detection process being executed using the memory area indicated by the notified rewrite information, by referring to the registered process information. In this case, the error detection process is an example of the first process. When the memory area used by an object detection process being executed is registered in the registered process information, the determination unit 35 determines whether the registered memory area is the same as the memory area indicated by the rewrite information notified by the error detection unit 32. When the memory area used by the object detection process being executed at least overlaps the memory area indicated by the rewrite information, the determination unit 35 determines that there is an object detection process being executed using the memory area in the shared memory 241 used by the error detection process. In this case, the object detection process being executed is an example of the second process.

When no object detection process being executed using the shared memory 241 is registered in the registered process information, the determination unit 35 determines that there is not an object detection process being executed using the memory area in the shared memory 241 used by the error detection process. When the memory area used by the object detection process being executed does not overlap the memory area indicated by the rewrite information notified by the error detection unit 32, the determination unit 35 also determines that there is not an object detection process being executed using the memory area used by the error detection process.

When there is another process using the shared memory 241, the determination unit 35 determines whether there is, for example, an object detection process being executed using the memory area in the shared memory 241 used by the former process, by processing similar to that described above. Similarly, the determination unit 35 determines whether there is another process being executed using the memory area in the shared memory 241 used by the object detection process or the error detection process, by processing similar to that described above.

The determination unit 35 notifies the process control unit 36 of the result of determination whether the second process being executed using the memory area in the shared memory 241 used by the first process exists as well as the priority of the first and second processes.

The process control unit 36 refers to the result of determination notified by the determination unit 35. When the second process having higher priority than the first process exists, the process control unit 36 interrupts the first process until termination of the second process. After termination of the second process of relatively high priority, the process control unit 36 notifies the first process of a retry request to cause the first process to be redone from the beginning.

When the second process having lower priority than the first process exists, the process control unit 36 interrupts the second process until termination of the first process. After termination of the first process, the process control unit 36 notifies the second process of a retry request to cause the second process to be redone from the beginning. In this way, the process control unit 36 causes an interrupted process of relatively low priority to be executed again after termination of a process of relatively high priority, which prevents omission of the process of relatively low priority.

In the present embodiment, the error detection process has higher priority than the object detection process, as described above. Thus, execution of the object detection process is interrupted in the case where the error detection process being executed by referring to a memory area in the shared memory 241 exists when the object detection unit 31 tries to write an image or intermediate data in the memory area. More specifically, the process control unit 36 interrupts execution of the object detection process by the object detection unit 31, and stores a flag indicating that the object detection process is waiting, in the memory 22. When notified by the update unit 34 that the error detection process is terminated, the process control unit 36 determines the presence or absence of the flag indicating that the object detection process is waiting, by referring to the memory 22. When the flag is stored in the memory 22, the process control unit 36 notifies the object detection unit 31 of a retry request to cause the object detection process to be redone from the beginning.

Execution of the object detection process is also interrupted in the case where, conversely, the object detection process being executed by referring to a memory area in the shared memory 241 exists when the error detection unit 32 tries to write time-series images or intermediate data in the memory area. More specifically, the process control unit 36 interrupts execution of the object detection process by the object detection unit 31, and stores a flag indicating that the object detection process is waiting, in the memory 22. When notified by the update unit 34 that the error detection process is terminated, the process control unit 36 determines the presence or absence of the flag indicating that the object detection process is waiting, by referring to the memory 22. When the flag is stored in the memory 22, the process control unit 36 notifies the object detection unit 31 of a retry request to cause the object detection process to be redone from the beginning. In this way, even during execution of the object detection process of relatively low priority, the error detection process of relatively high priority is executed without waiting for termination of the object detection process.

When there is another process using the shared memory 241 other than the object detection process and the error detection process, the process control unit 36 also causes a process of relatively high priority to be preferentially executed by processing similar to that described above.

Figure 4:
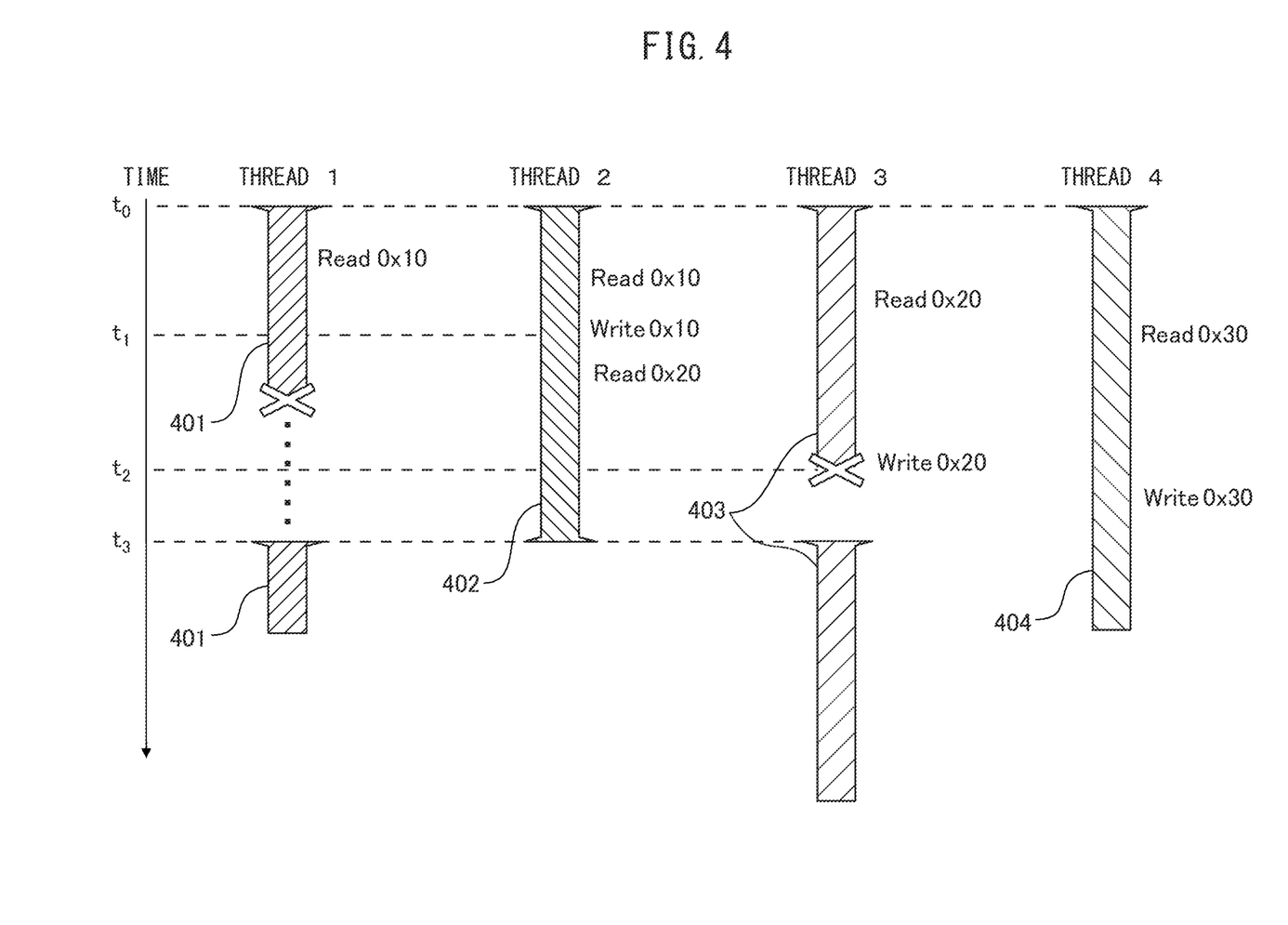
FIG. 4 is a schematic diagram for explaining the resource management process.

FIG. 4 is a schematic diagram for explaining the resource management process. In this example, there are four types of processes using the shared memory 241. In FIG. 4, these four types of processes are represented as threads 1 to 4. The degrees of priority of the processes decrease in the order of threads 2, 1, 3, and 4. In other words, thread 2 has the highest priority whereas thread 4 has the lowest priority. In FIG. 4, the vertical axis represents elapsed time. Blocks 401 to 404 of the respective threads represent the periods during which operation of the respective threads is executed. In this example, threads 1 to 4 start being executed in parallel at the same time t0; and then, thread 1 first refers to data stored in a memory area in the shared memory 241 starting from address 0x10. Next, thread 2 refers to the memory area in the shared memory 241 starting from address 0x10, and rewrites data in the memory area starting from address 0x10 at time t1. Hence, execution of thread 1, which has lower priority than thread 2 and refers to the memory area whose data has been rewritten by thread 2, is interrupted. Thread 1 is executed again from the beginning at time t3 when execution of thread 2 is terminated.

Further, after thread 2 refers to a memory area starting from address 0x20, thread 3 tries to rewrite data in the memory area starting from address 0x20 at time t2. However, since thread 3 has lower priority than thread 2, the data in the memory area starting from address 0x20 is not rewritten, and thread 3 is executed again from the beginning at time t3 when execution of thread 2 is terminated.

In addition, thread 4 accesses a memory area in the shared memory 241 starting from address 0x30 during execution thereof, but this memory area does not overlap the memory areas that the other processes refer to. Hence, even though thread 4 has lower priority than the other processes, thread 4 is executed to the end without being interrupted.

Figure 5:
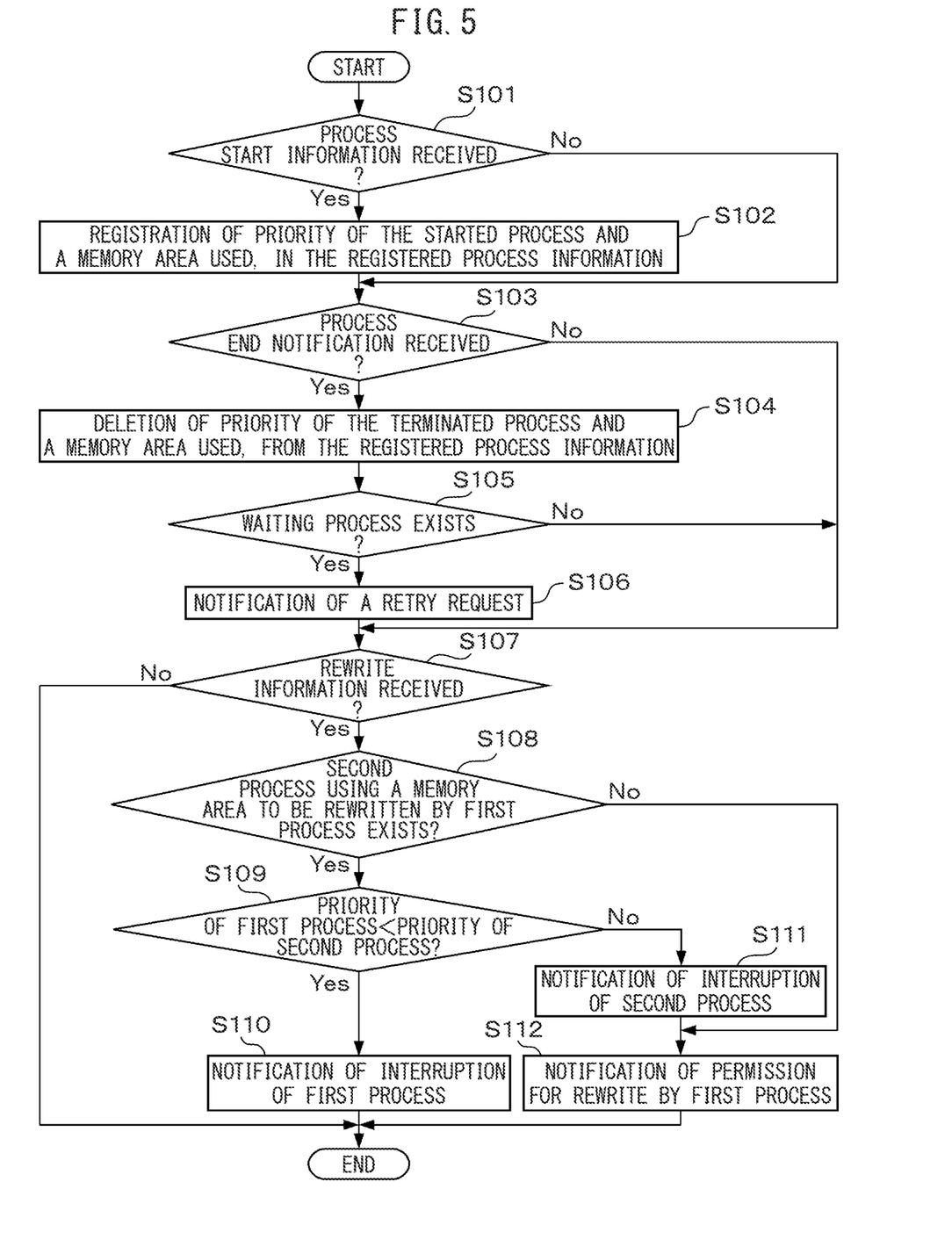
FIG. 5 is an operation flowchart of the resource management process.

FIG. 5 is an operation flowchart of the resource management process executed by the processor 24. The processor 24 executes the resource management process in accordance with the operation flowchart described below at predetermined intervals.

The update unit 34 of the processor 24 determines whether process start information is received from the object detection unit 31 or the error detection unit 32 (step S101). When process start information is received (Yes in step S101), the update unit 34 reads registered process information from the memory 22. The update unit 34 then adds priority of the started process and a memory area used in the shared memory 241, which are indicated by the process start information, to the registered process information (step S102).

After step S102 or when the update unit 34 has not received process start information (No in step S101), the update unit 34 determines whether process end notification is received from the object detection unit 31 or the error detection unit 32 (step S103). When process end notification is received (Yes in step S103), the update unit 34 reads the registered process information from the memory 22. The update unit 34 then deletes information indicating priority of the terminated process (in this example, the object detection process or the error detection process) notified in the process end notification and a memory area used, from the registered process information (step S104). In addition, the process control unit 36 of the processor 24 determines whether there is a waiting process (step S105). When there is a waiting process (Yes in step S105), the process control unit 36 makes notification of a retry request so that the waiting process is executed (step S106).

After step S106, the determination unit 35 of the processor 24 determines whether rewrite information is received from the object detection unit 31 or the error detection unit 32 (step S107). When the update unit 34 has not received process end notification (No in step S103) or when there is not a waiting process (No in step S105), the determination unit 35 also determines whether rewrite information is received (step S107).

When rewrite information is received (Yes in step S107), the determination unit 35 refers to the registered process information and determines whether there is another process (second process) being executed using a memory area that the process (first process) indicated by identifying information included in the rewrite information tries to rewrite (step S108).

When the second process exists (Yes in step S108), the process control unit 36 determines whether the first process has lower priority than the second process, by referring to the registered process information (step S109). When the first process has lower priority than the second process (Yes in step S109), the process control unit 36 makes notification of interruption of the first process (step S110). For example, when the first process is the object detection process and the second process is the error detection process, the process control unit 36 notifies the object detection unit 31 of interruption of the object detection process.

When the first process has higher priority than the second process (No in step S109), the process control unit 36 makes notification of interruption of the second process being executed (step S111). For example, when the first process is the error detection process and the second process is the object detection process, the process control unit 36 notifies the object detection unit 31 of interruption of the object detection process. The process control unit 36 then makes notification that the first process is permitted to rewrite the memory area (step S112).

When the second process does not exist in step S108 (No in step S108), the process control unit 36 also makes notification that the first process is permitted to rewrite the memory area (step S112).

After step S110 or S112, the processor 24 terminates the resource management process.

As has been described above, the resource management device uses registered process information to manage priority of a process being executed using a shared resource among a plurality of processes and an area in the shared resource used by the process. More specifically, when a first process being executed using the shared resource rewrites data stored in the shared resource, the resource management device refers to the registered process information and determines whether a second process being executed using an area in the shared resource used by the first process exists. When the second process having higher priority than the first process exists, the resource management device interrupts the first process until termination of the second process. When the second process having lower priority than the first process exists, the resource management device interrupts the second process until termination of the first process. Thus the resource management device can ensure that a high-priority process is preferentially executed among multiple processes using a shared resource when the processes contend for use of the shared resource.

The resource management device may be applied to any system other than a vehicle control system. The resource management device can be applied to various devices or systems that assign a shared resource to processes occurring asynchronously and assigned degrees of priority to execute these processes.

As described above, those skilled in the art may make various modifications according to embodiments within the scope of the present invention.

What is claimed is:

1. A resource management device, comprising:
a memory configured to store registered process information indicating priority of a process being executed using a shared resource among a plurality of processes and an area in the shared resource used by the process; and
a processor configured to:
update the registered process information so as to add, at every start of execution of one of the processes, the priority and the area of the one of the processes to the registered process information and to delete, at every end of use of the shared resource in one of the processes, the priority and the area of the one of the processes from the registered process information,
determine, when a first process being executed using the shared resource among the processes rewrites data stored in the shared resource, whether a second process being executed using an area in the shared resource used by the first process exists among the processes, by referring to the registered process information,
interrupt the first process until termination of the second process when the second process having higher priority than the first process exists, and
interrupt the second process until termination of the first process when the second process having lower priority than the first process exists.

2. The resource management device according to claim 1, wherein in the case where the first process is interrupted, the processor causes the first process to be executed again from the beginning, upon termination of the second process having higher priority than the first process.

3. The resource management device according to claim 1, wherein one of the processes is an object detection process to detect a predetermined object represented in a sensor signal generated by a sensor from the sensor signal, another one of the processes is an error detection process to detect an error or trouble that has occurred in the sensor, and the error detection process is assigned higher priority than the object detection process.

4. A method for resource management, comprising:
- updating registered process information indicating priority of a process being executed using a shared resource among a plurality of processes and an area in the shared resource used by the process, the registered process information being stored in a memory, so as to add, at every start of execution of one of the processes, the priority and the area of the one of the processes to the registered process information and to delete, at every end of use of the shared resource in one of the processes, the priority and the area of the one of the processes from the registered process information;
- determining, when a first process being executed using the shared resource among the processes rewrites data stored in the shared resource, whether a second process being executed using an area in the shared resource used by the first process exists among the processes, by referring to the registered process information;
- interrupting the first process until termination of the second process when the second process having higher priority than the first process exists; and
- interrupting the second process until termination of the first process when the second process having lower priority than the first process exists.

5. A non-transitory recording medium that stores a computer program for resource management, the computer program causing a computer to execute processing comprising:
- updating registered process information indicating priority of a process being executed using a shared resource among a plurality of processes and an area in the shared resource used by the process, the registered process information being stored in a memory, so as to add, at every start of execution of one of the processes, the priority and the area of the one of the processes to the registered process information and to delete, at every end of use of the shared resource in one of the processes, the priority and the area of the one of the processes from the registered process information;
- determining, when a first process being executed using the shared resource among the processes rewrites data stored in the shared resource, whether a second process being executed using an area in the shared resource used by the first process exists among the processes, by referring to the registered process information;
- interrupting the first process until termination of the second process when the second process having higher priority than the first process exists; and
- interrupting the second process until termination of the first process when the second process having lower priority than the first process exists.

* * * * *